United States Patent [19]
Kreidler

[11] 3,896,682
[45] July 29, 1975

[54] MEASURING/INDICATING INSTRUMENT
[75] Inventor: Alfred Kreidler, Zurich, Switzerland
[73] Assignee: Metall-Invent S.A., Zug, Switzerland
[22] Filed: Nov. 7, 1973
[21] Appl. No.: 406,171

[52] U.S. Cl. .......................... 74/606 R; 58/7; 58/54; 58/55; 58/104; 58/140 R
[51] Int. Cl. ............................................. F16h 57/02
[58] Field of Search .............. 74/606 R; 58/7, 8, 53, 58/54, 55, 104, 140 R

[56] References Cited
UNITED STATES PATENTS

| 3,058,293 | 10/1962 | Egger | 57/7 X |
| 3,058,654 | 10/1962 | Prohaska et al. | 74/606 X |
| 3,398,590 | 8/1968 | Campbell et al. | 74/89.14 |
| 3,446,085 | 5/1969 | Ginsberg | 74/89.14 |
| 3,500,703 | 3/1970 | Schertel et al. | 74/606 |
| 3,732,685 | 5/1973 | Haydon | 58/8 X |

*Primary Examiner*—Samuel Scott
*Assistant Examiner*—F. D. Shoemaker
*Attorney, Agent, or Firm*—Pugh & Laiche

[57] ABSTRACT

A measuring or indicating instrument in which the parts forming the transmission means are arranged between first and second parallel support plates, the said parts being functionally mounted in the radial direction solely by support members connected to one or the other of the support plates, and in the axial direction by both plates.

16 Claims, 8 Drawing Figures

PATENTED JUL 29 1975　　　3,896,682

SHEET 1

MEASURING/INDICATING INSTRUMENT

BACKGROUND OF THE PRESENT INVENTION

The invention relates to a measuring or indicating instrument, and is particularly although not exclusively related to a clock in which the parts which form the transmission means are arranged between two parallel support plates.

The assembly of such devices is difficult and time consuming, and requires specially trained personnel and expensive workshop equipment. The invention is intended to provide an instrument which is simple and cheap to manufacture and requires no costly tools and equipment for the assembly thereof.

According to the present invention in a measuring or indicating instrument the parts forming the transmission means are arranged between first and second parallel support plates, the said parts being functionally mounted in the radial direction solely by support members connected to one or the other of the support plates, and in the axial direction by both support plates.

The term "radial direction" is used herein to mean a direction parallel to the two support plates, and the term "axial direction" a direction perpendicular thereto. Again, the term "functionally mounted" is used in relation to parts forming the transmission means which have to move with a restricted or unrestricted rotational mobility corresponding to their function or a specific displaceability in the radial direction and for the fixed parts of the transmission means their fixing in the position for use.

Preferably the support members for the functional mounting of the said parts are carried by only the first support plate, the said parts being pushed into or onto said support members and being axially located by the second support plate in conjunction with the first support plate.

Linked with the sought simplification and cost reduction the support plates can be circular and be connected via a cylindrical wall so that the first support plate, together with the said wall forms a base portion of a casing surrounding said parts forming the transmission means, and the other support plate which is flat or provided with annular steps forms a cover thereof.

Further advantageous or appropriate details of the invention can be gathered from the following description and claims.

BRIEF DESCRIPTION OF THE DRAWINGS

The invention can be performed in many ways but one embodiment will now be described by way of example and with reference to the accompanying drawings which show an electric clock with magnetically driven ratchet wheel and in which.

BRIEF DESCRIPTION OF THE PREFERRED EMBODIMENTS

Figure 1:
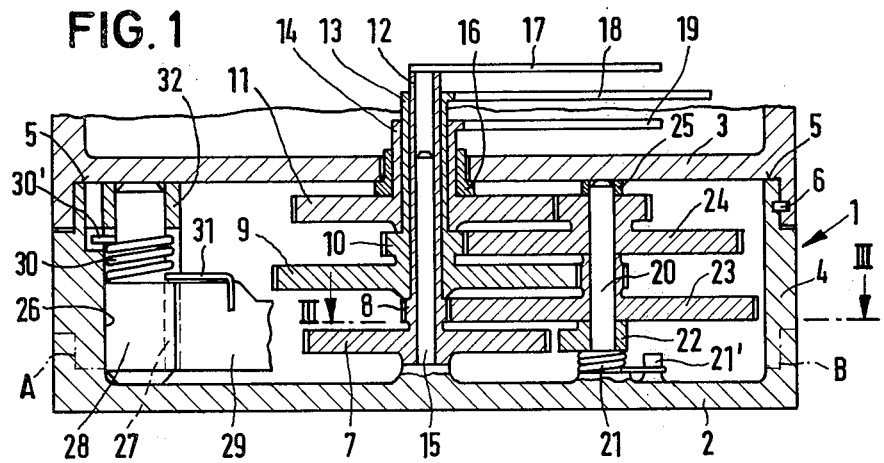
FIG. 1 is a longitudinal section through the clock.
Figure 2:
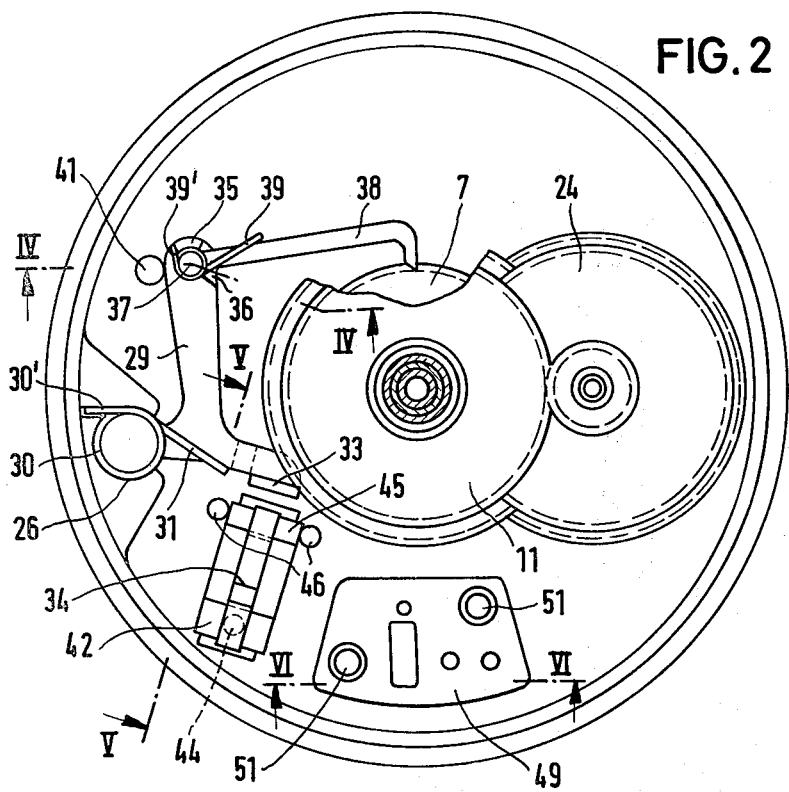
FIG. 2 is a plan view with the upper support plate removed.
Figure 3:
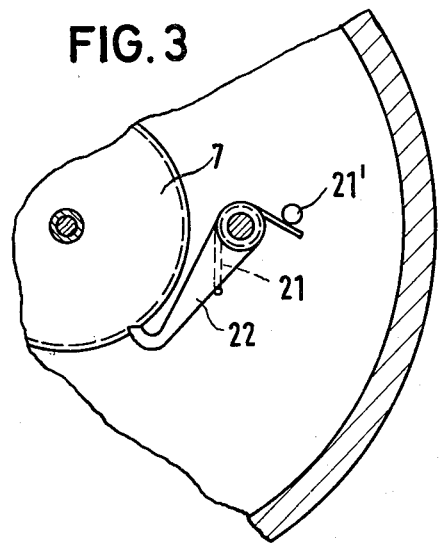
FIG. 3 is a part section along the line III—III of FIG. 1.

The clockwork mechanism is placed in a cylindrical casing 1 whose base 2 is formed by a first support plate and whose cover 3 is formed by a second support plate. The cover 3 can itself form the base of the hand housing and can carry or form the instrument dial. A cylindrical wall 4 of clockwork casing 1 has an abutment face 5 which determines the spacing of the two support plates, that is, of base 2 and cover 3. Cover 3 is connected with the casing wall 4 by a bayonet catch 6 or by a spring catch (not shown). Casing base 2, together with the parts rigidly connected therewith and cover 3 are produced by injection moulding from a plastics material.

A notched wheel 7 with 60 notches which forms the second wheel, and which is connected with an intermediate wheel 10, and hour wheel 11 are introduced into one another with their hollow indicator shafts 12, 13 and 14 and forced onto a spindle 15 which points upwards in the centre of base 2. A flanged bushing 16 is forced onto the hour hand shaft 14 and forms with its flange a spacer in such a way that the set of wheels 7–11 are held in the axial direction with a running fit between cover 3 and base 2. The hand shafts carry a second hand 17, minute hand 18 and hour hand 19.

In addition, base 2 carries a further spindle 20 which is also placed in a similar support boss on base 2 and held with a close fit between the latter and cover 3. Spindle 20 serves as a counter shaft and carries on the support boss a hinge spring 21 for loading, a ratchet 22 for second wheel 7 and which is located above it on shaft 20. Ratchet spring 21 is supported on a pin 21' projecting from base 2. In addition, counter shaft 20 also carries a pair of counter shaft wheels 23 and 24 and above them a spacer ring 25 so that said counter shaft wheels 23 and 24 and ratchet 22 are held with a running fit between cover 3 and base 2. The dimensions of the complete clockwork are selected in such a way that the gear reduction ratio of the second wheel 7 to the minute wheel 9 is 60:1, and for minute wheel 9 to hour wheel 11, 12:1.

A bearing 26 having a perpendicular axis is provided on wall 4 and this has a continuous slot 27 parallel to its axis. In bearing 26 is inserted a pivot spindle 28, to which is rigidly fixed a ratchet lever 29 which projects through said slot 27 so that it can be pivoted to a limited extent about the axis of bearing 26. A biasing spring 30 is provided for the ratchet lever 29 and this has a wound central portion located in bearing 26 and forced onto an upper smaller diameter section of the ratchet lever pivot spindle 28. One end 30 of the spring is fixed in a notch on the upper face of bearing 26 and the other end 31 passes through slot 27 and engages with the ratchet lever 29. A spacer sleeve 32 inserted between upper face of bearing 26 and cover 3 with a tight fit retains restoring spring 30 in its axial position whilst the ratchet lever pivot spindle is sufficiently long to ensure that it is enclosed with a running fit between cover 3 and base 2.

Ratchet lever 29 carries the armature 33 for an electro-magnet 34, on one arm whilst a bearing 35 having an elongated slot 36 is provided on the other arm. A pin 37 is inserted in bearing 35 which is rigidly connected with a ratchet 38 which projects from slot 36 and which therefore has limited pivotal movement about the axis of bearing 35. Ratchet pin 37 carries in bearing pin 35 on an upper portion of smaller diameter a ratchet spring 39 one end 39' of which is held in a notch in the face of bearing 35, whilst the other end engages with ratchet 38. A cap 40 placed in the upper section of ratchet pin 37 serves as a spacer in order to fix the above-indicated parts between base 2 and cover 3 in the axial direction, and so that a certain axial springiness of the wound section of ratchet spring 39 limits the contact pressure. A stop pin 41 on base 2 limits the backstroke of the ratchet system 29, 38.

A rear support 42 on magnet 34 has a bore 43 with which it is located on a short stud 44 on base 2. In addition magnet 34 has a front support 45 which is fixed between two further supports 46 which project above base 2. A bridge 47 which engages in notches on the two supports 42, 45 secures the position of magnet 34 by means of an upwardly directed extension 48 which rests against cover 3. As a result of the form and material the bridge has a certain resilience so that it does not impair the correct spacing between base 2 and cover 3.

A control panel 49 for the timing members and which forms part of the transmission means is mounted in analogous manner. It has two bores 50 by means of which it is placed on two studs 51 which project upwards from base 2. To secure the position of control panel 49 tubular spacers are placed on studs 51 against the faces of which rests cover 3. These spacers 52 are also made from somewhat resilient material so that they cannot impair the correct spacing between base 2 and cover 3.

The clockwork operates in a simple manner, 60 current pulses per minute act on magnet 34 and drives via ratchet system 29, 38 second wheel 7 which each second effects a fractional pitch and each minute one rotation. Corresponding to the reduction gear ratio of the clockwork, minute wheel 9 performs one rotation per hour, and hour wheel 11 one rotation in 12 hours.

As can be understood from the above constructional description and is clearly visible from the drawing, all parts or assemblies of the clockwork can be inserted from above into the base portion of the casing comprising base 2 and wall 4 and pushed or dropped into position without the use of tools and the cover 3 then placed in position. All the parts or assemblies are kept in their correct radial position by the support members which are connected with base portion 2, 4 and in addition are axially fixed between base 2 and cover 3. Conversely all parts or assemblies can, after removing cover 3, be detached from their plug connections and removed upwardly, without any special tools.

Although it is recommended that the base portion 2, 4 together with the support members (bolts, supports, bosses, pins, studs) for the clockwork members or assemblies be produced in one piece as an injection moulding from plastics material, it is also possible to produce wall 4 and base 2 as separate members as indicated by broken lines at A and B in FIG. 1. They can then, for example, be connected by a bayonet or catch. Wall 4 as a support member for ratchet lever bearing 26 is then placed on the lower support plate, that is base 2 and determines with its abutment faces on both sides the correct spacing of the support plates that is base 2 and cover 3. Depending on the construction and use of the clockwork, it is possible for stay bolts or spindles on which movable members are mounted to be provided with abutment faces for spacing the support plates.

Figure 8:
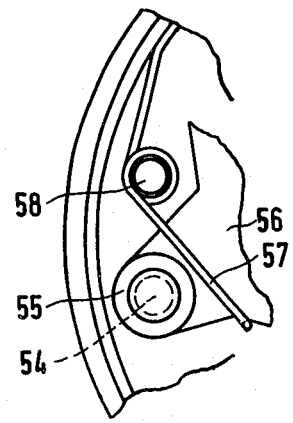
FIG. 8 is a part plan view of the arrangement shown in FIG. 7.
Figure 4:
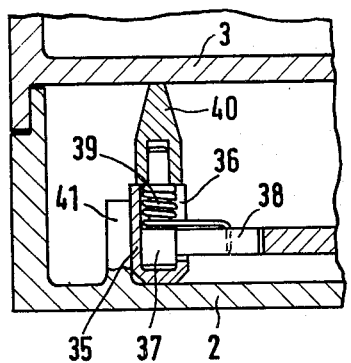
FIG. 4 is a part section along the line IV—IV of FIG. 2.
Figure 5:
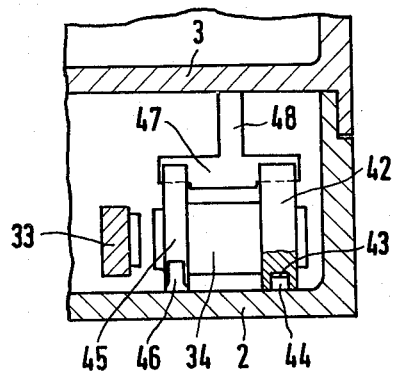
FIG. 5 is a part section along the line V—V of FIG. 2.
Figure 6:
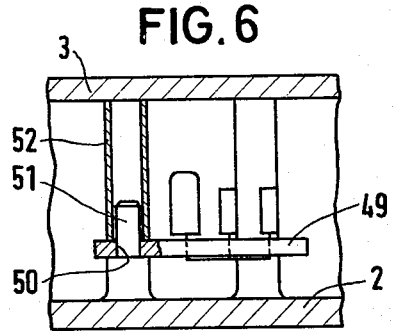
FIG. 6 is a part section along the line VI—VI of FIG. 2.
Figure 7:
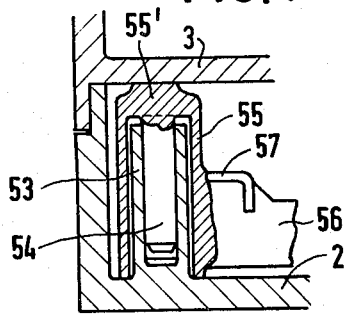
FIG. 7 is a part section representing a somewhat modified construction of the support for the ratchet lever.

In an alternative construction in FIGS. 7 and 8, the ratchet lever bearing is formed by a hollow pin 53. Ratchet lever pivot spindle 54 is connected by a cap 55' with ratchet lever 56. An extension 55' on cap 55 locates the axial position in such a way that ratchet lever 56 by means of ratchet lever pin 54 is held with a running fit between base 2 and cover 3. The wound central portion of restoring spring 57 is placed on a special pin 58 located on base 2 and its axial position is arranged by a tubular spacer (not shown) similar to spacers 52 which are provided for control panel 49.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A measuring or indicating instrument, such as for example a clock, comprising:
    a. a housing including -
        a first support plate (2) having three support members on its inner side;
        a second support plate (3) at least generally parallel to said first support plate;
        wall means (24) connected to said plates for joining said support plates together; and
    b. transmission system means supported by and within said housing for transmitting movement from a movement source to an indicator system including a first set of wheels (7, 10, 11) having concentric, hollow shafts (12, 13, 14) carrying indicator means at their ends, said ends protruding thorugh an opening in said second support plate, said first set of wheels being concentrically mounted one on top of the other by means of said concentric hollow shafts on one of said support members (15); a second set of wheels (23, 24) in engagement with said first set of wheels mounted on the second of said support members; and movement means (29, 38) serving as a movement source connected to one (7) of said first set of wheels for driving said wheel, said movement means being mounted on the other one of said support members;
    said first and second sets of wheels and said movement means being functionally mounted in the radial direction solely by said support members of said first support plate, and said sets of wheels and said movement means being pushed onto or into said support members and being located in the axial direction by both said support plates; whereby said transmission system means can be readily and easily assembled in or disassembled from said housing without difficulty and without special tools.

2. A measuring or indicating instrument according to claim 1, in which the support members are made integral with the first support plate which carries them.

3. A measuring or indicating instrument according to claim 1, in which a casing wall located on the first support plate carries a bearing member.

4. A measuring or indicating instrument according to claim 3, in which the casing wall and the first support plate are made from a plastics material.

5. A measuring or indicating instrument according to claim 1, in which the support members for said wheels which have to rotate formed as spindles on which said wheels are fitted.

6. A measuring or indicating instrument according to claim 1, in which the support member for a wheel which has to rotate is formed as a hollow boss having a bearing bore in which said wheel is located.

7. A measuring or indicating instrument according to claim 1, in which said movement means pivots and has a pivot spindle, and in which the support member for said movement means is formed as a hollow bearing which is provided with an elongated slot and in which said pivot spindle is inserted, with a portion of said movement means extending through said elongated slot.

8. A measuring or indicating instrument according to claim 7, in which a spring is provided to bias and is constructed said transmission system, means as a hinge spring which has a wound central section located on said spindle and with one end secured to the bearing and its other end passing through said elongated slot and engaging said portion of said transmission system means which also extends through said elongated slot.

9. A measuring or indicating instrument according to claim 1 in which said wall means is formed with an abutment which determines the spacing of said support plates.

10. A measuring or indicating instrument according to claim 1 in which at least some of said support members are provided with abutment faces for determining the spacing apart of the support plates.

11. A measuring or indicating instrument according to claim 9, in which said support plates are circular and are connected via a cylindrical wall, so that one support plate together with said wall forms a base portion of a casing surrounding said parts forming the transmission system means and the other support plate forms a cover thereof.

12. A measuring or indicating instrument according to claim 11, in which the support plates and said wall are interconnected by catches.

13. A measuring or indicating instrument according to claim 1 in which the parts forming the transmission system means are held between said support plates with tolerances allowing rotation.

14. A measuring or indicating instrument according to claim 13, in which the said tolerances are provided by spacers between said parts and the support plates.

15. A measuring or indicating instrument according to claim 14, in which the spacers and the said parts are resiliently deformable in the axial direction.

16. A measuring or indicating instrument according to claim 1, in which the support member for said movement means which has to pivot is formed as a hollow boss having a bearing bore in which said movement means is located.

* * * * *